United States Patent [19]
Hahn

[11] Patent Number: 6,154,001
[45] Date of Patent: Nov. 28, 2000

[54] ANTI-GLITCH CIRCUIT FOR VOICE-COIL-MOTOR SERVO OPERATION IN DISK DRIVE SYSTEMS

[75] Inventor: Dennis Vernon Hahn, Plano, Tex.

[73] Assignee: Texas Instruments Incorporated, Dallas, Tex.

[21] Appl. No.: 09/447,509

[22] Filed: Nov. 23, 1999

[51] Int. Cl.[7] ................................................ G05F 1/00
[52] U.S. Cl. ..................... 318/678; 318/611; 388/910
[58] Field of Search .................... 318/611, 685, 318/767, 798, 806, 254, 138, 439, 678; 360/73.01, 73.02; 323/280; 388/910; 330/102, 260, 271

[56] References Cited

U.S. PATENT DOCUMENTS

| | | | |
|---|---|---|---|
| 4,197,489 | 4/1980 | Dunn et al. ........................... | 318/138 |
| 4,228,387 | 10/1980 | Brown ................................... | 318/696 |
| 5,250,881 | 10/1993 | Yoshino ................................ | 318/254 |
| 5,264,774 | 11/1993 | Ito ......................................... | 318/798 |
| 5,331,259 | 7/1994 | Naito .................................... | 318/254 |
| 5,523,660 | 6/1996 | Fujii ...................................... | 318/254 |
| 5,905,390 | 5/1999 | Koga ..................................... | 327/110 |

*Primary Examiner*—David Martin
*Assistant Examiner*—Rina I. Duda
*Attorney, Agent, or Firm*—W. Daniel Swayze, Jr.; Wade James Brady, III; Frederick J. Telecky, Jr.

[57] ABSTRACT

A circuit to pull down a driver circuit of a motor, including a circuit to monitor the input signal to a driver amplifier to compare the input signal with the output signal from the motor and to output a difference signal when the input signal and the output signal are different, and a circuit to pull down the driver circuit in response to the difference signal.

10 Claims, 12 Drawing Sheets

ANTI-GLITCH CIRCUIT FOR VOICE-COIL-MOTOR SERVO OPERATION IN DISK DRIVE SYSTEMS

FIELD OF THE INVENTION

The present invention relates generally to the field of disk drive circuits, and more particularly to a method and circuit for driving a hard disk drive motor and the associated control.

BACKGROUND OF THE INVENTION

A hard disk drive generally includes a stack of rotating disks or platters, a spindle motor which causes the disk to rotate, read/write heads which fly above the surface of the disks, an actuator motor (known as a "voice coil motor" or VCM) which controls the positioning of the read/write heads, power circuitry to provide electrical power to the spindle and voice coil motors, and control circuitry to control the operation of the spindle and voice coil motors.

A read/write head reads data from the disk by sensing flux changes on the magnetic surface of the disk as it passes beneath the read/write head. To synchronize the data being read from the disk with the operation of the data processing circuitry, it is necessary to carefully control the speed of the rotation of the disks. This is usually accomplished by controlling the current delivered to the spindle motor.

The switching characteristics of the VCM power devices are very important in achieving good performance from the motor and other favorable characteristics. However, a problem has been developed in the control of the voice coil motors in that a "glitch" occurs in the high-side and low-side drivers. This glitch couples a noise spike into the channel chip and reduces the bit error rate, making it difficult to obtain a high performance read channel. This glitch is caused by the input signal saturating the driver circuits. More particularly, the output stage of the driver circuits are driven to saturation. As the input stage comes out of saturation, the output stage does not follow the input signal as a result of the saturation. Once the output stage comes out of saturation and starts to respond, a glitch or rapid decrease in output signal results.

SUMMARY OF THE INVENTION

The present invention compares the input to both the low-side and high-side driver with the output from the amplifier of the voice coil motor (VCM) and detects whenever the output of the amplifier is not following the input signal. Thus, when the input signal comes out of saturation, the output of the output stage can be modified to follow the input signal more directly, eliminating the noise which is input to the read channel. A comparator compares the input signal with the output signal, and when these two signals exceed an offset, a pair of transistors is turned on to drive a gate of the power FETs.

DETAILED DESCRIPTION OF THE PRESENT INVENTION

The present invention is described with reference to figures in which similar or the same numbers represent the same or similar elements. While the invention is described in terms of achieving the invention's objectives, it can be appreciated by those skilled in the art that variations may be accomplished in view of those teachings without deviation from the spirit and scope of the invention.

Figure 8:
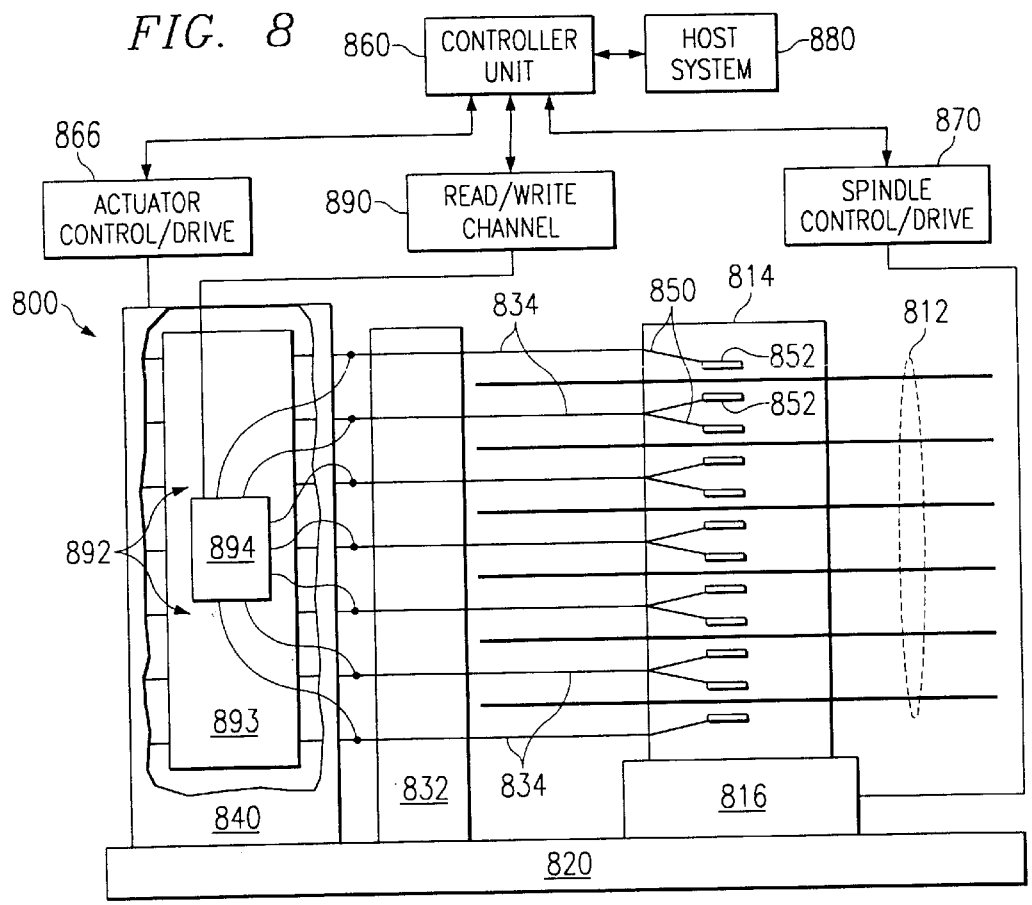
FIG. 8 illustrates a side view of a disk drive system.
Figure 9:
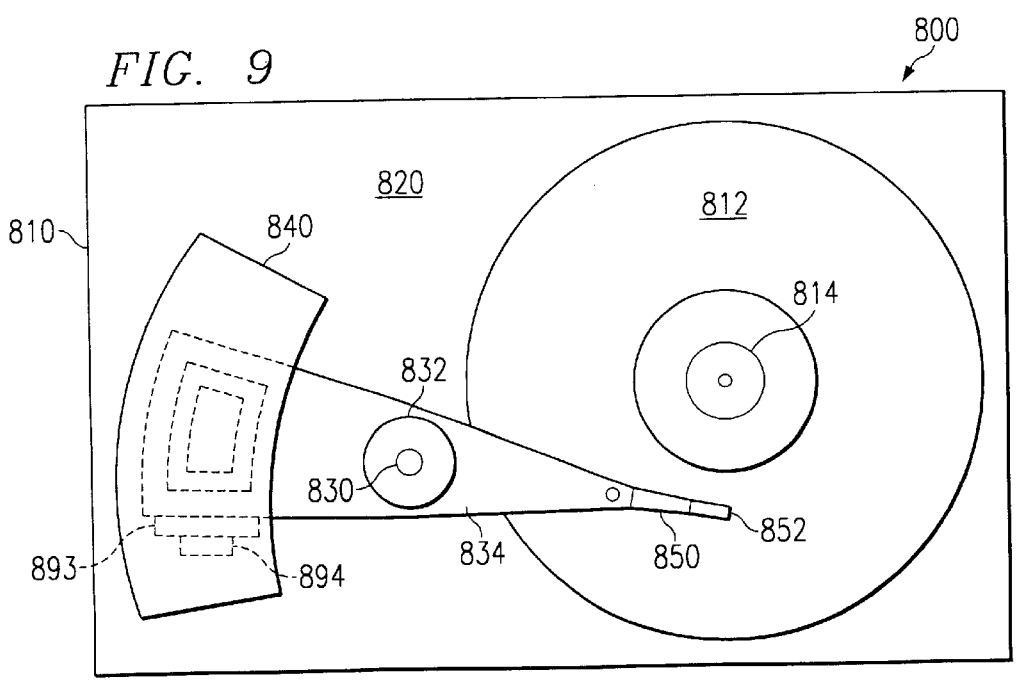
FIG. 9 illustrates a top view of a disk drive system.

FIGS. 8 and 9 show a side and top view, respectively, of a disk drive system designated by general reference number 800 within enclosure 810. The disk drive system includes a plurality of stacked magnetic rotating disks 812 mounted to spindle 814. The disks 812 may be conventional particulate or thin film recording disks, or in other embodiments, they may be liquid bearing disks. The spindle 814 is attached to a spindle motor 816 which rotates the spindle 814 and disks 812. A chassis 820 is connected to the enclosure 810, providing stable mechanical support for the disk drive system. The spindle motor 816 and the actuator shaft 830 are attached to the chassis 820. A hub assembly 832 rotates about the actuator shaft 830 and supports a plurality of actuator arms 834. The stack of actuator arms 834 is sometimes referred to as a "comb." A rotary voice coil motor 840 is attached to the chassis 820 and to a rear portion of the actuator arms 834. The present invention is applicable to hard disk drives as well as removable media drives.

A plurality of head suspension assemblies 850 is attached to the actuator arms 834. A plurality of inductive transducer heads 852 is attached respectively to the suspension assemblies 850, each head including at least one inductive write element. In addition thereto, each head 852 may include an inductive read head or an MR (magneto-resistive) read element. The heads 852 are positioned proximate to the disks 812 by the suspension assemblies 850 so that during operation, the heads are in electromagnetic communication with the disks 812. The rotary voice coil motor 840 rotates the actuator arms 834 about the actuator shaft 830 in order to move the head suspension assemblies 850 to the desired radial position on the disks 812.

A control unit 860 provides overall control to the disk drive system 800, including rotational control of the disks 812 and position control of the heads 852. The control circuit of the present invention involves the speed control of disks 812. The controller unit 860 includes (not shown) a central processing unit (CPU), a memory unit, and other digital circuitry, although it should be apparent to those skilled in the computer arts that those aspects could also be enabled by hardware logic by one skilled in the computer arts. Control unit 860 is connected to the actuator control/drive unit 866 which is in turn connected to the rotary voice coil motor 840.

A host system 880, typically a computer system or personal computer (PC) is connected to the control unit 860. The host system 880 may send digital data to the control unit 860 to be stored on the disks 812, or it may request that digital data at a specified location may be read from the disks 812 and then sent back to the host system 880.

A read/write channel 890 is coupled to receive and condition read and write signals generated by the control unit 860 and communicate them to an arm electronics (AE) unit shown generally at 892 through a cutaway portion of the voice coil motor 840. The AE unit 892 includes a printed circuit board 893 or a flexible carrier mounted on actuator arms 834, or in close proximity thereto, and an AE module 894 mounted on the printed circuit board 893 or the carrier that comprises circuitry, preferably implemented in an integrated circuit (IC) chip including read drivers, write drivers, and associated control circuitry. The AE module 894 is coupled by connections to the printed circuit board on the read/write channel 890 and also to each read head and each write head in the plurality of heads 852.

Figure 10:
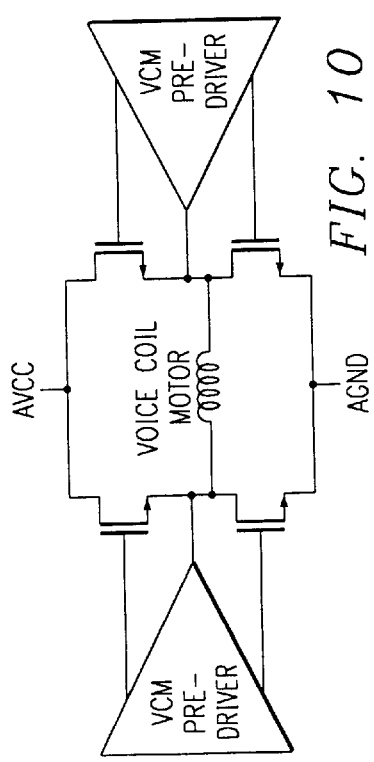
FIG. 10 illustrates the VCM output stage.

A voice coil motor output circuit is illustrated in FIG. 10.

The present invention uses a comparator circuit to monitor the input signal at the input differential stage of the driver amplifier. The comparator circuit employs an offset voltage to allow the input signal to change slightly without the need to activate the additional circuitry. When the change to the input signal is greater than the offset voltage when compared with the output signal of the voice coil motor, the comparator circuit outputs a signal that is used to pull down the gate of the high-side driver or to pull down the gate of the low-side driver power FET quickly. This greatly reduces the time for slew rate of gates, reducing the time that the driver is out of compliance and, in essence, eliminates the glitch, preventing noise from entering the read channel.

Figure 1:
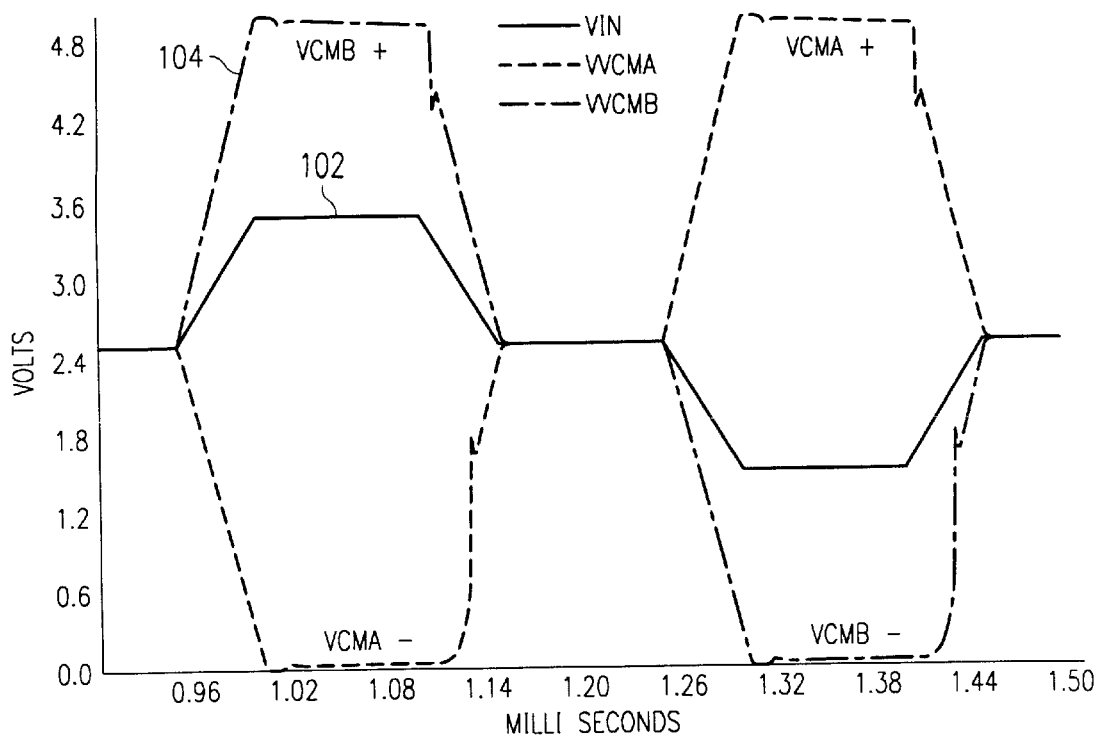
FIG. 1 illustrates a comparison of the input signal with the output signal and resulting glitch.
Figure 2:
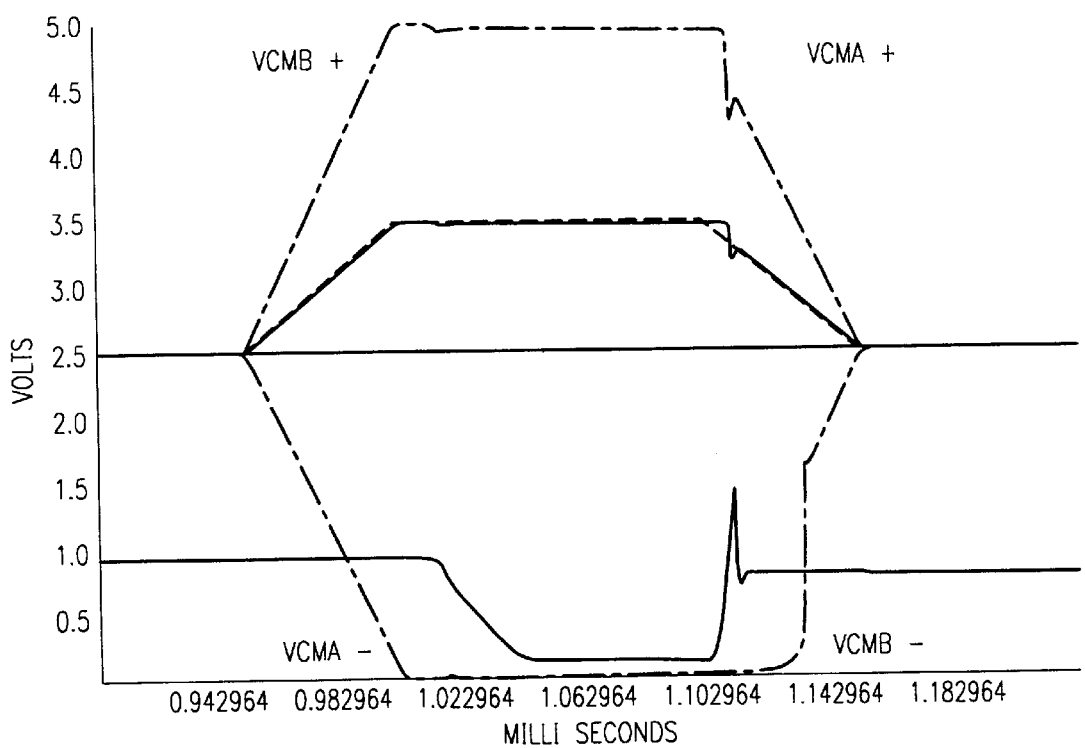
FIG. 2 illustrates the input signal and feedback from the amplifier circuit.
Figure 3:
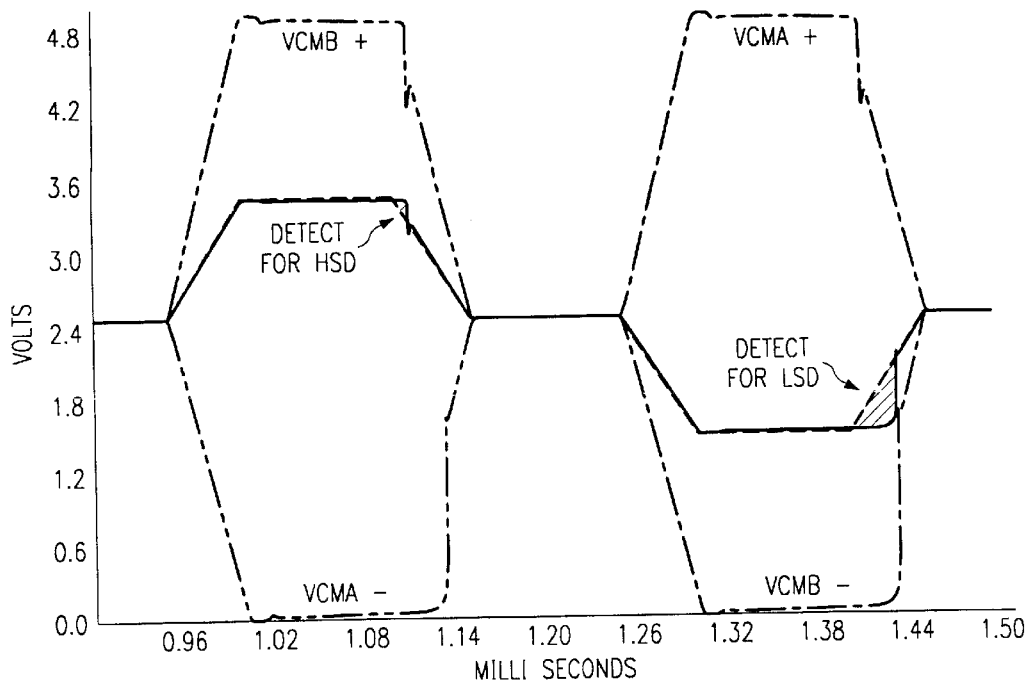
FIG. 3 illustrates the output from the amplifier and the input for the low-side driver and high-side driver.
Figure 4:
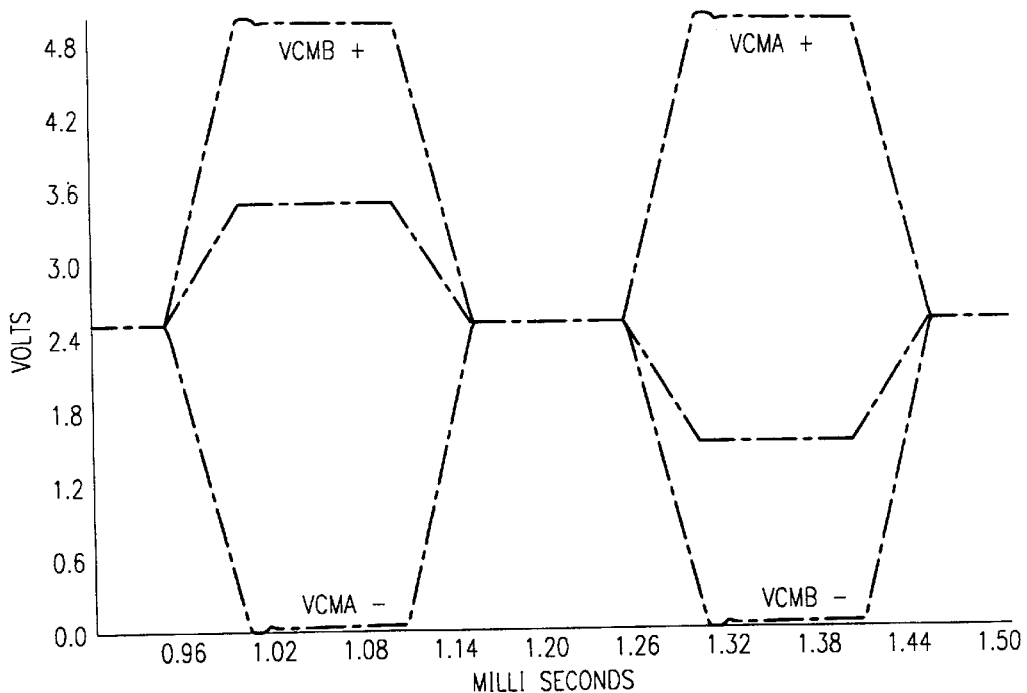
FIG. 4 illustrates input and output signals with the circuit of the present invention.
Figure 5:
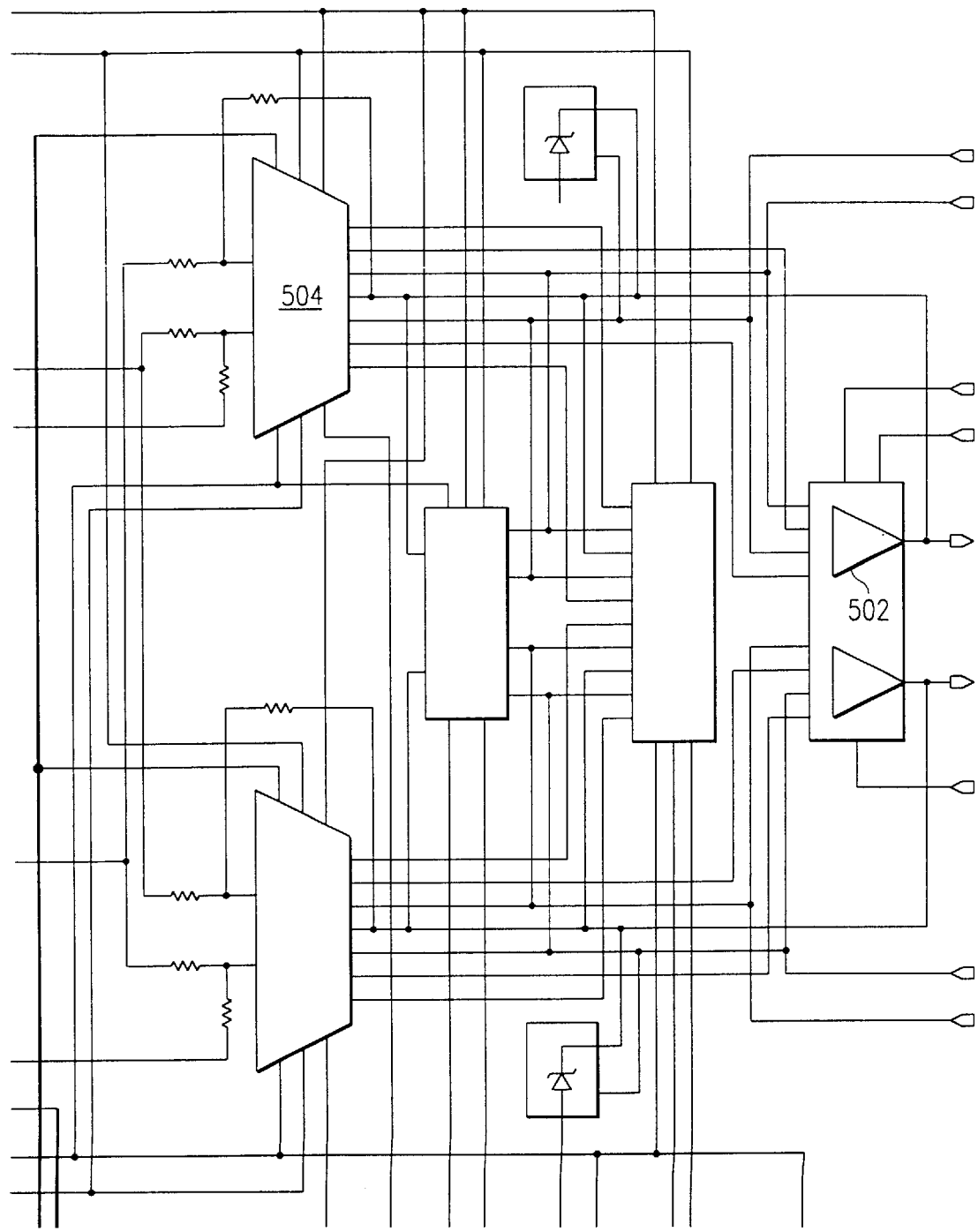
FIG. 5 illustrates an overview of the circuit of the present invention.
Figure 6A:
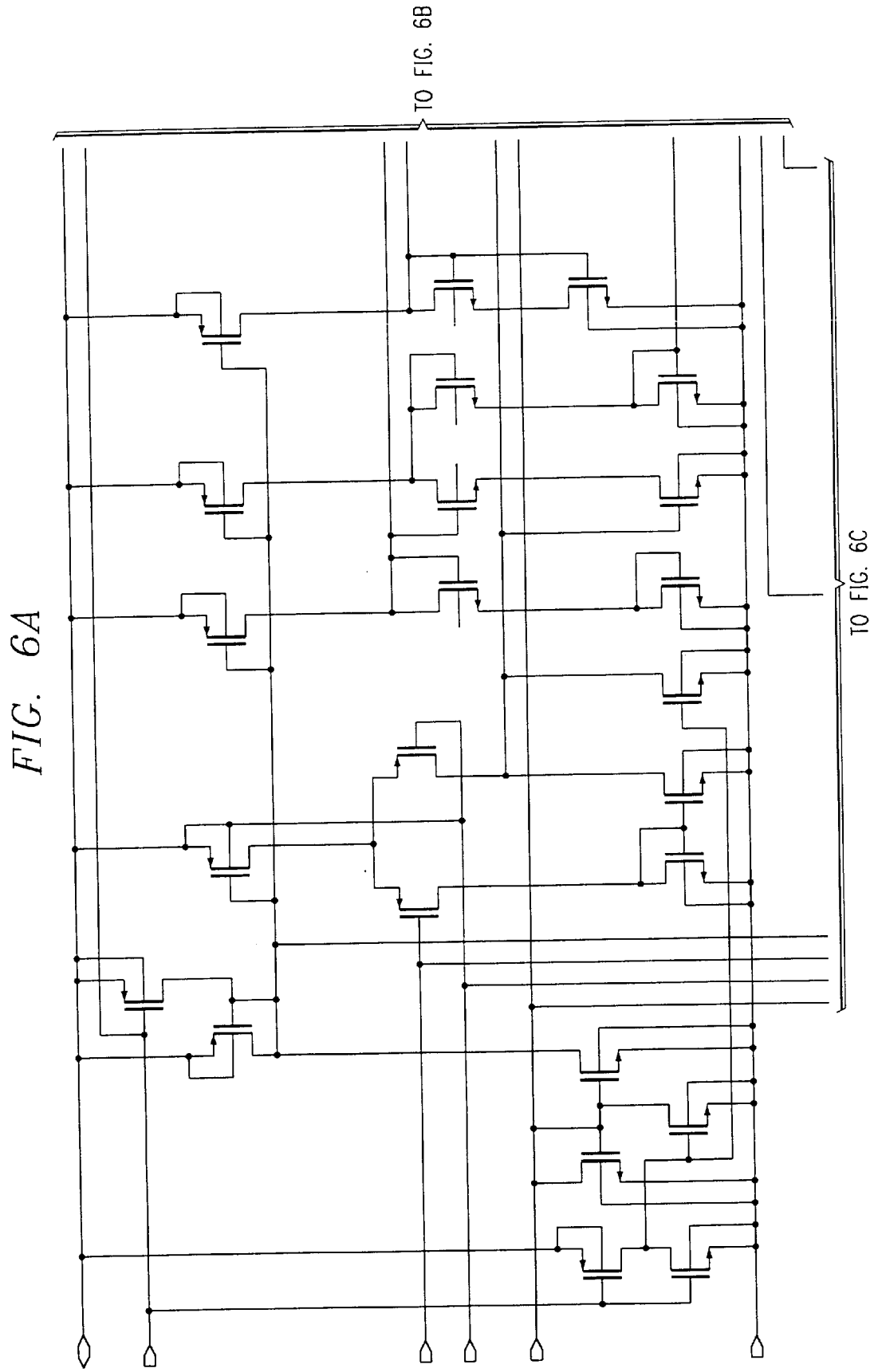
FIG. 6 illustrates another overview of the circuit of the present invention.
Figure 6B:
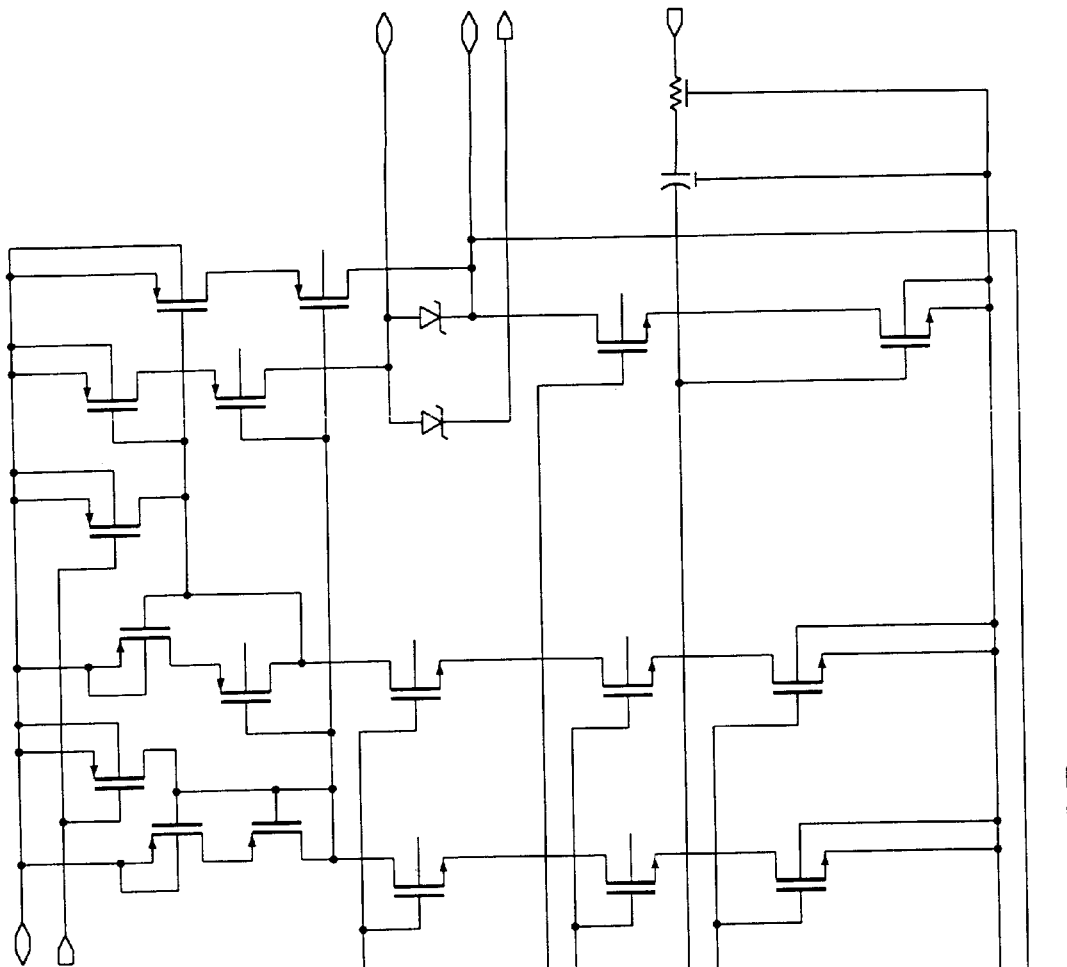
Figure 6B:
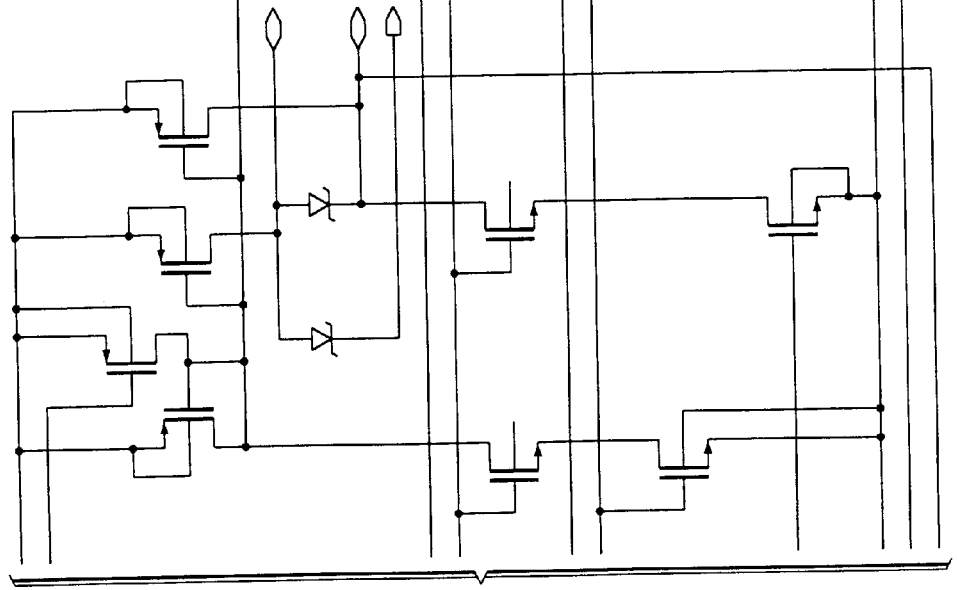
Figure 6C:
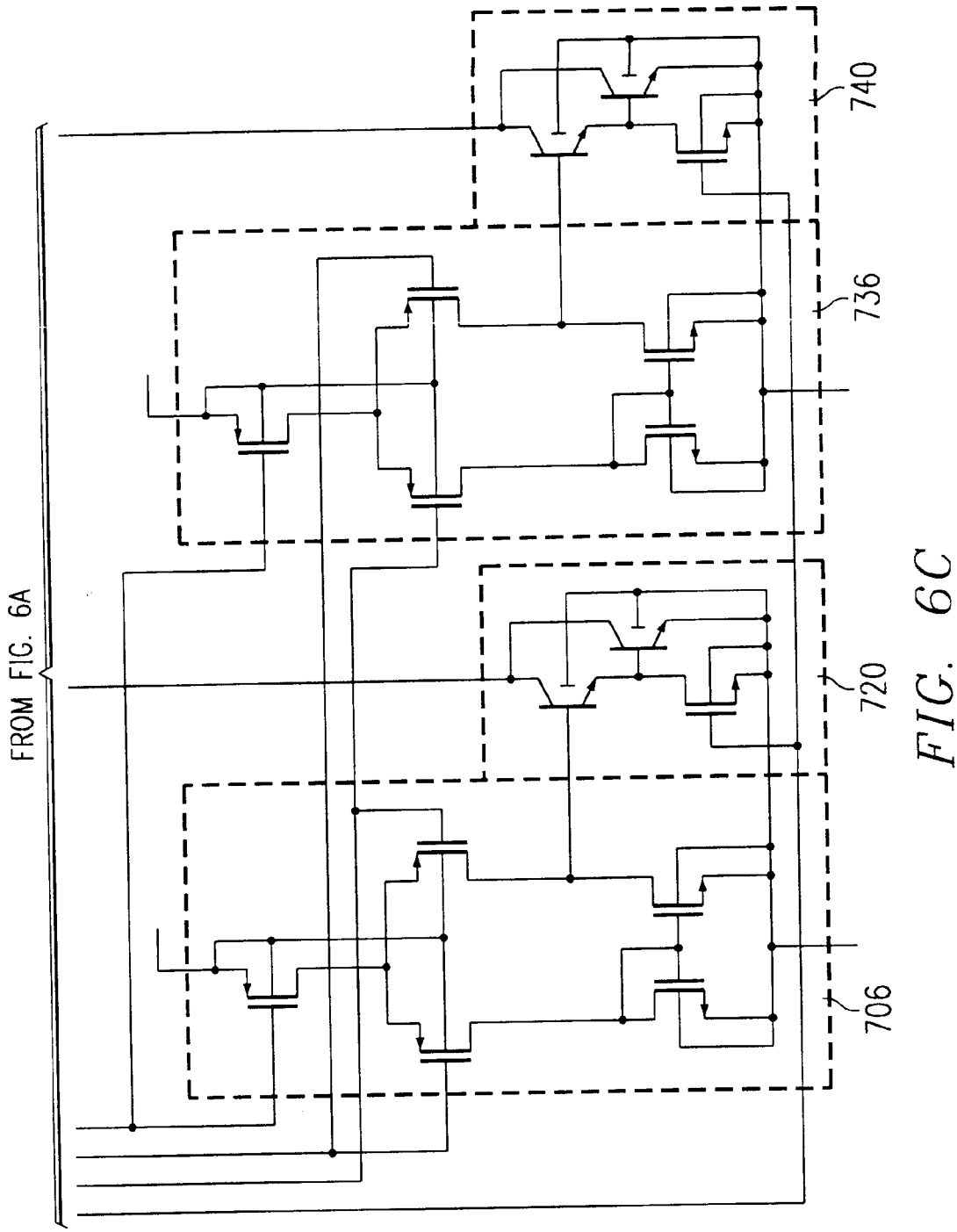

The circuit 504, as illustrated in FIG. 5, inputs a signal to the gate of the power FET 502 to indicate that the VCM driver should be pulled from saturation. Circuit 504, as illustrated in FIG. 5, is a VCM pre-driver circuit and inputs two signals each to the gates of two power FETs in circuit 502, a high-side driver and low-side driver. Together, circuits 504 and 502 form a VCM driver circuit. Two VCM driver circuits are used to control a voice coil motor in a typical half H-bridge configuration. The anti-glitch circuits in circuit 504 input signals to the gates of the power FETs in 502 to indicate the high-side and low-side VCM driver should be pulled from saturation.

FIG. 6 illustrates an overall diagram of the comparator circuit 706, comparator circuit 736, pull-down circuit 720, and pull-down circuit 740.

Figure 7:
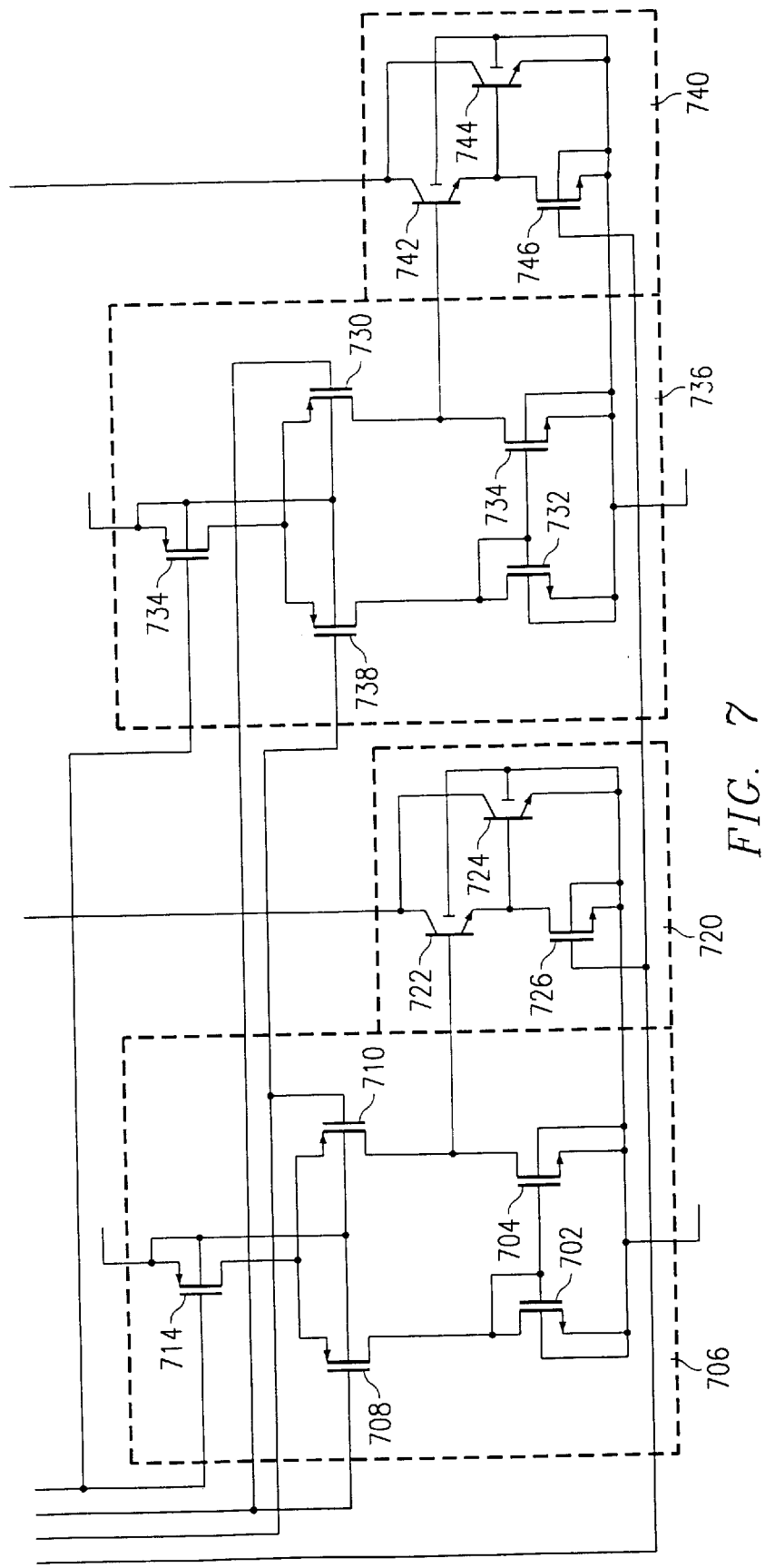
FIG. 7 illustrates a more detailed circuit of the present invention.

Turning now to FIG. 7, a comparator 706 includes FET 714 having a source connected to voltage $V_{cc}$ and a drain connected to the source of FET 708 and FET 710. The gate of FET 714 is connected to a control circuit (not shown). For example, FET 708 may include four fingers of 28×5 microns, and FET 712 may have four fingers of 24×5. The difference in sizes of these FETs results in 15 millivolts of offset. This offset is sufficient so that small variations in voltage are ignored. Typically, a voltage of between 100 and 200 millivolts difference will be detected in the comparator 706 when there is saturation. The drain of FET 708 is connected to the gate and drain of NFET 702. The source of NFET 702 is connected to ground. The drain of PFET 710 is connected to the drain of NFET 704. The source of NFET 704 is connected to ground. Additionally, the gate of NFET 704 is connected to the gate of NFET 702. The comparator 706 is connected to the pull-down circuit 720 which includes Darlington transistors. The base of transistor 722 is connected to the drain of NFET 704. It is through this connection that comparator 706 is connected to the pull-down circuit 720. The comparator, through this connection, activates the pull-down circuit. The collectors of transistor 722 and transistor 724 are connected to the gate of power FET driver for the high side. The emitter of transistor 722 is connected to the base of transistor 724, and the collector of transistor 722 is connected to the collector of transistor 724. The NFET 726 includes a drain connected to the base and emitter of transistors 724 and 722, respectively. The gate of NFET 726 is connected to receive a control signal from control circuit (not shown), and the source of NFET 726 is connected to ground. The low-side comparator and Darlington transistor is connected in the same way.

In operation, when PFET 708 is turned on, this allows current to flow in current mirror, more specifically, NFET 702. The current is mirrored to NFET 704. This brings the base of Darlington transistor 722 low which turns off transistor 722 and transistor 724. When a glitch is detected, the gate of PFET 708 has a voltage higher than the gate of transistor 710 that turns PFET 708 off and PFET 710 on. As a consequence, no current flows in PFET 708, and no current flows in NFET 702, and consequently, no current will flow in NFET 704. If PFET 710 is turned on, and current flows through the source to drain to the base of transistor 722, transistor 722 is turned on which turns on transistor 724. Thus, current flows from the gate of the power FET to pull the VCM driver out of saturation. The current from the power FET flows through transistor 722. NFET 726 acts as a current sink to pull a constant current from the node. This allows a quick turn-off.

The operation of comparator 736 and pull-down circuit 740 operates in a similar fashion. However, this acts to pull the power FET for the low-side driver out of saturation.

Figure 11:
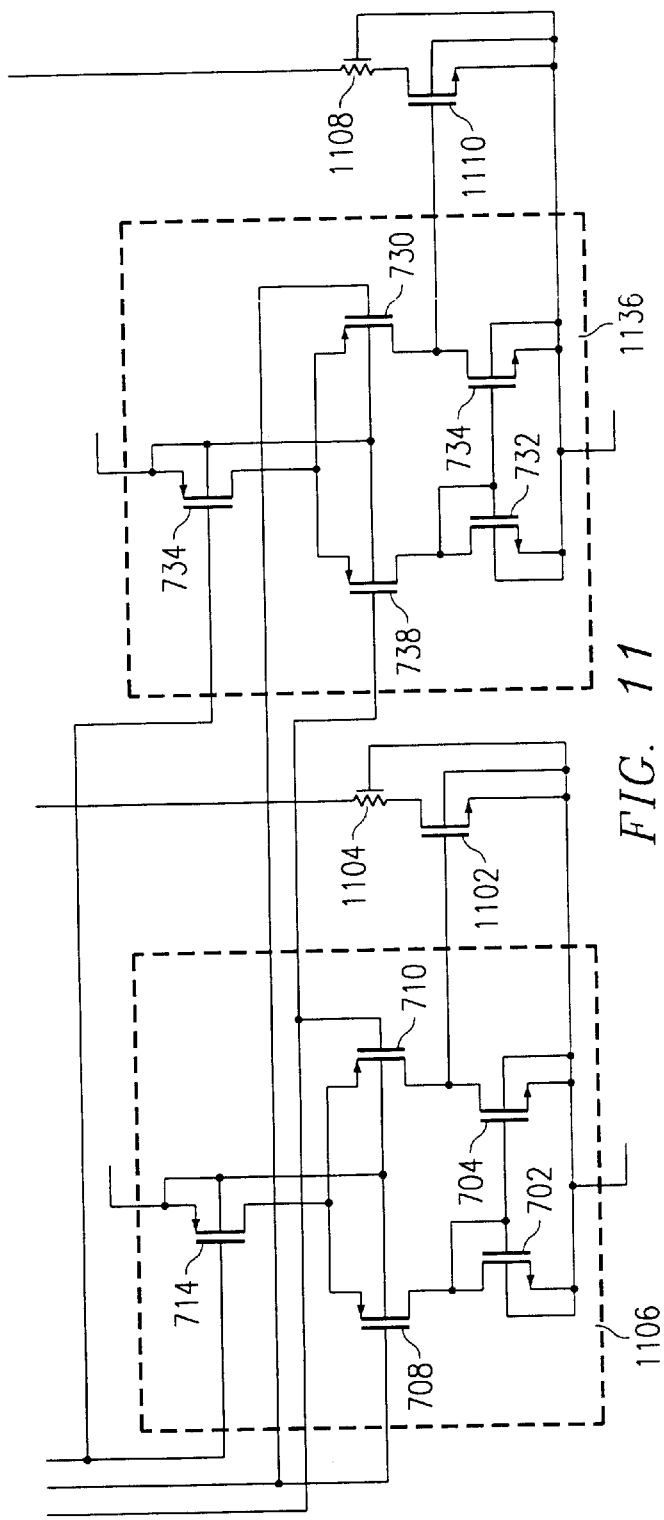
FIG. 11 illustrates a further overview of the circuit of the present invention.

In FIG. 11, circuit 706 operates the same as circuit 1106, but now, when the PFET 710 turns on, it drives the gate of the NMOS transistor 1102 to a high voltage. The NMOS transistor 1102 turns on, and the drain pulls current from the circuit node attached to the gate of the output power FET. This will quickly pull the VCM driver, in this case the high-side driver, out of saturation. A resistor 1104 is connected between the drain of the NMOS transistor 1102 and the gate of the output power FET. It is used to help isolate voltage fluctuations on the output power FET from coupling back into the anti-glitch circuit. Transistor 1110 and resistor 1108 operate in a similar fashion.

Figure 12A:
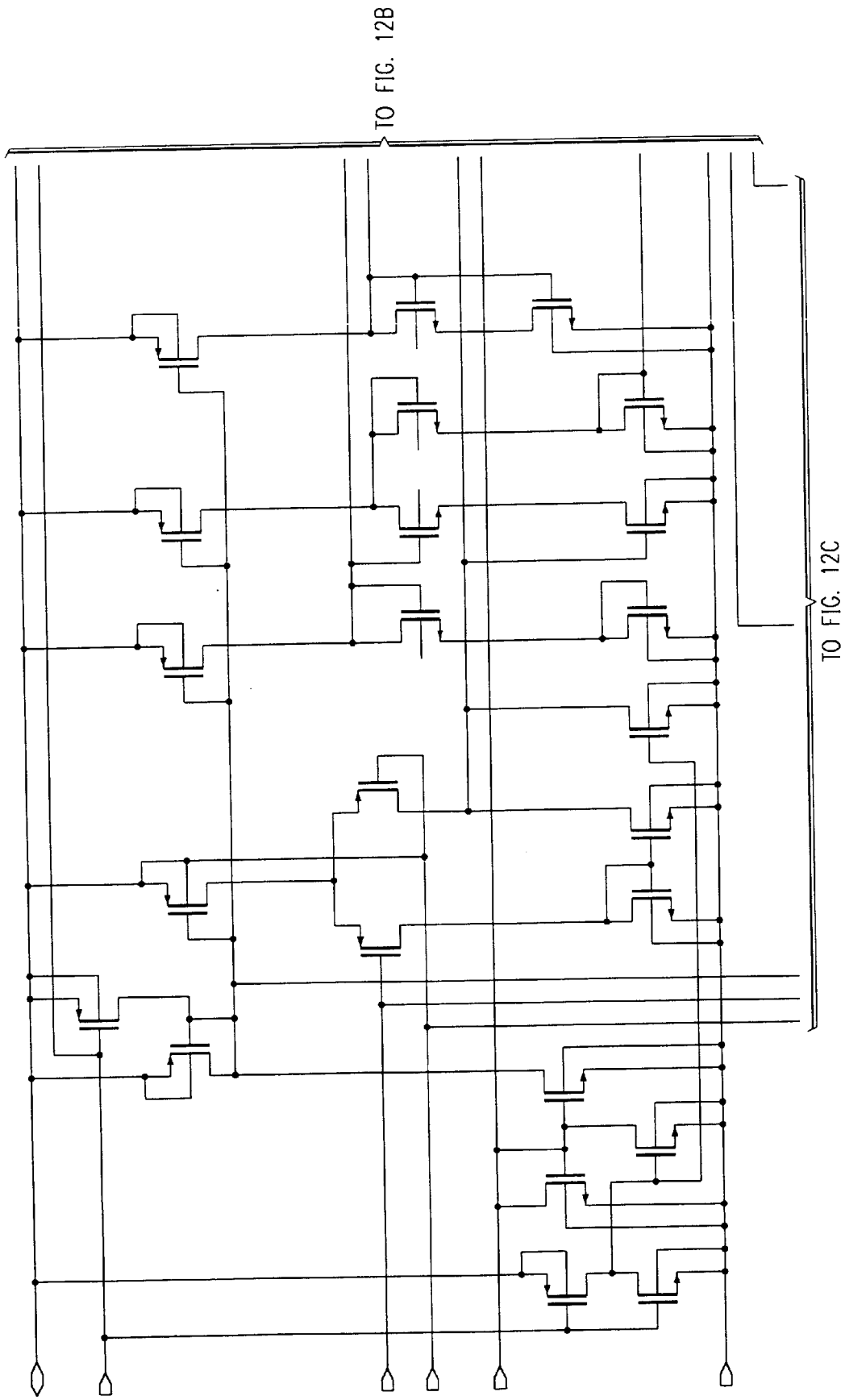
FIG. 12 illustrates a further detailed circuit of the present invention.
Figure 12B:
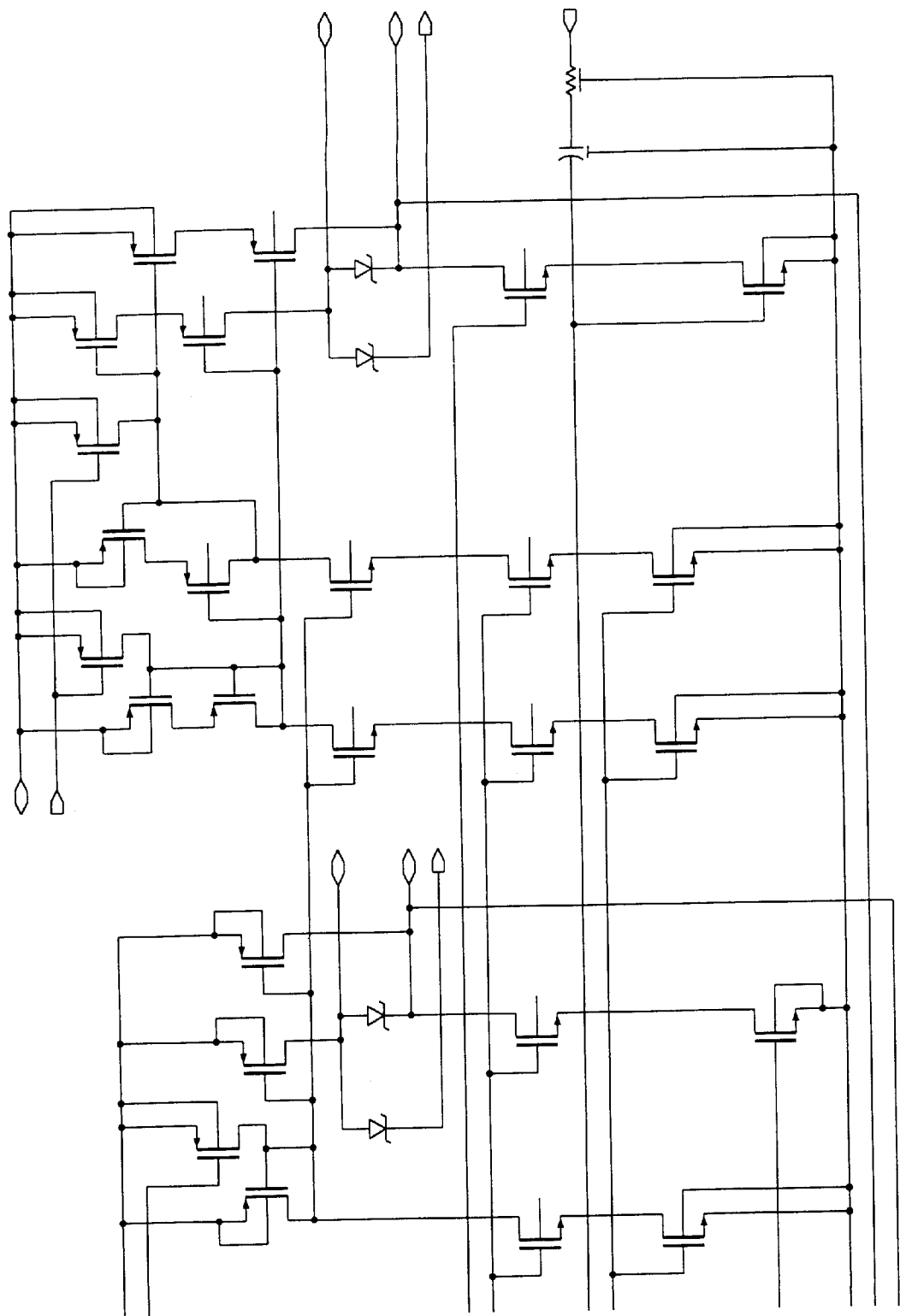
Figure 12C:
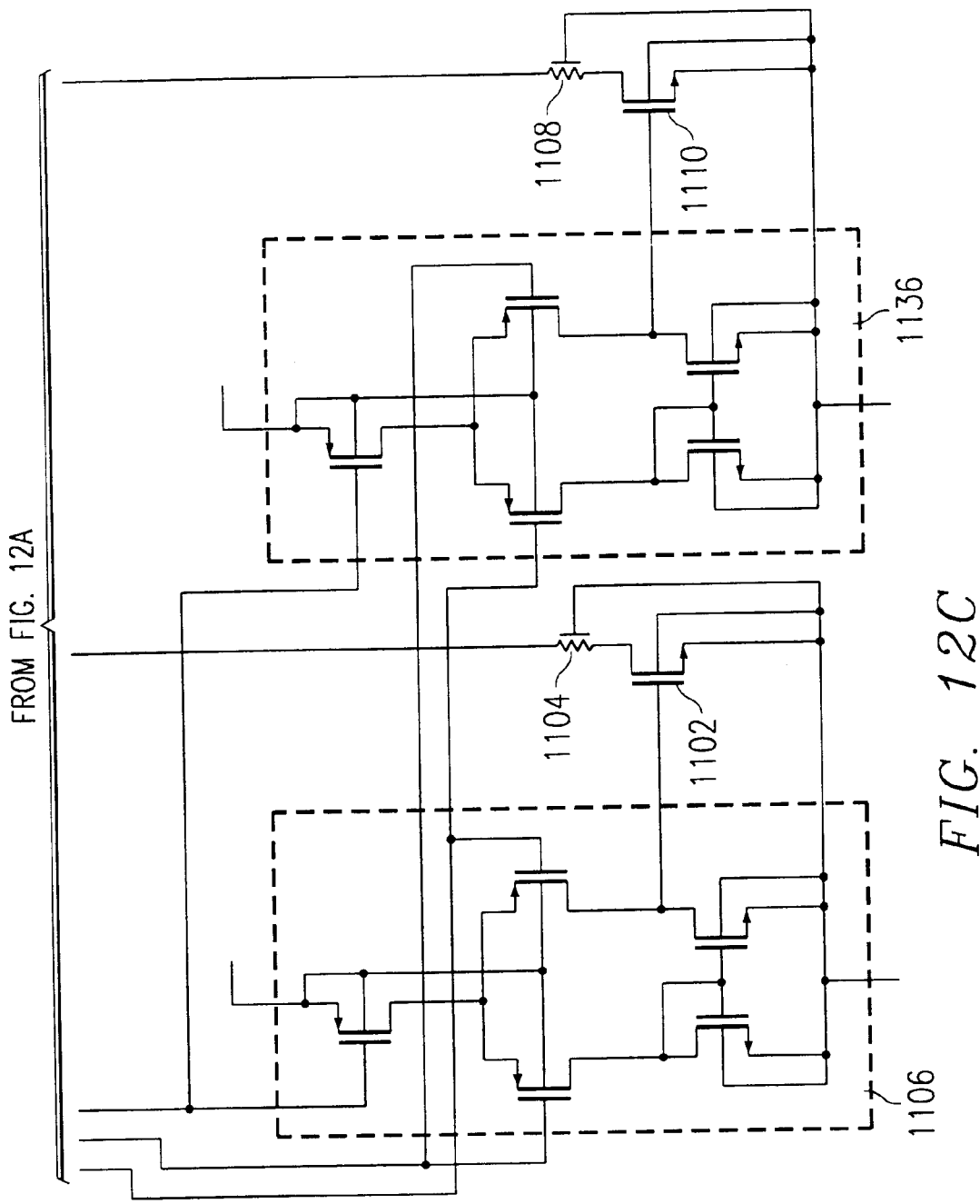

FIG. 12 is a circuit including circuit 1106 and circuit 1136.

What is claimed is:

1. A circuit to pull down a driver circuit of a motor, comprising:

a circuit to monitor an input signal to a driver amplifier of the motor to compare the input signal with an output signal from the motor and to output a difference signal when the input signal and the output signal are different; and a circuit to pull down said driver circuit in response to said difference signal.

2. A circuit to pull down a driver circuit of a motor as in claim 1, wherein said circuit to monitor is a comparator circuit.

3. A circuit to pull down a driver circuit of a motor as in claim 1, wherein said pull-down circuit is a Darlington circuit.

4. A circuit to pull down a driver circuit of a motor as in claim 1, wherein said driver circuit is a high driver circuit.

5. A circuit to pull down a driver circuit of a motor as in claim 1, wherein said driver circuit is a low driver circuit.

6. A system for reading and writing information, comprising:
- a disk to store said information;
- a motor to rotate said disk;
- a driver circuit to energize said motor;
- a circuit to monitor an input signal to a driver amplifier of the motor to compare the input signal with an output signal from the motor and to output a difference signal when the input signal and the output signal are different; and
- a circuit to pull down said driver circuit in response to said difference signal.

7. A system for reading and writing information as in claim 6, wherein said circuit to monitor is a comparator circuit.

8. A system for reading and writing information as in claim 6, wherein said pull-down circuit is a Darlington circuit.

9. A system for reading and writing information as in claim 6, wherein said driver circuit is a high driver circuit.

10. A system for reading and writing information as in claim 6, wherein said driver circuit is a low driver circuit.

* * * * *